(12) United States Patent
Bouchard et al.

(10) Patent No.: US 9,736,007 B1
(45) Date of Patent: Aug. 15, 2017

(54) METHOD AND APPARATUS FOR AUTOMATED DATA PROTECTION WITH IT INFRASTRUCTURE VISIBILITY

(75) Inventors: Peter A. Bouchard, Norton, MA (US); David C. Dysert, Holliston, MA (US); Hamid R. Farshi, Newton, MA (US); Cara P. Garber, Franklin, MA (US); Christopher J. Hackett, Boylston, MA (US); Puneet B. Lal, Shrewsbury, MA (US); Madhup Mishra, Marlborough, MA (US); Ananthan K. Pillai, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/339,420

(22) Filed: Dec. 29, 2011

(51) Int. Cl.
H04L 29/06 (2006.01)
H04L 29/14 (2006.01)

(52) U.S. Cl.
CPC .................................. H04L 29/14 (2013.01)

(58) Field of Classification Search
None
See application file for complete search history.

(56) References Cited

U.S. PATENT DOCUMENTS

| | | | |
|---|---|---|---|
| 6,526,418 B1 * | 2/2003 | Midgley et al. | 707/640 |
| 6,845,383 B1 * | 1/2005 | Kraenzel et al. | |
| 7,155,463 B1 * | 12/2006 | Wang et al. | 707/634 |
| 7,200,609 B2 * | 4/2007 | Schutzman et al. | |
| 7,290,017 B1 * | 10/2007 | Wang et al. | |
| 7,539,745 B1 * | 5/2009 | Wang et al. | 709/224 |
| 7,827,136 B1 * | 11/2010 | Wang et al. | 707/610 |
| 2005/0010529 A1 * | 1/2005 | Zalewski et al. | 705/54 |
| 2005/0021713 A1 * | 1/2005 | Dugan et al. | 709/223 |

OTHER PUBLICATIONS

EMC, "Increasing Recoverability of Critical Data with EMC Data Protection Advisor and Replication Analysis", May 2010, EMC Corporation, p. 1-11.*

* cited by examiner

Primary Examiner — Jeffery Williams
(74) Attorney, Agent, or Firm — Krishnendu Gupta

(57) ABSTRACT

IT organizations are challenged with maintaining data application and availability while satisfying service level agreements and compliance requirements. Unprecedented data growth is straining IT resources requiring greater investments, while capital and operational expenses are under scrutiny. Given this tension, IT organizations are seeking efficiency and optimization to regain control and meet business SLAs. Example embodiments of the present invention provide a method, an apparatus, and a computer program product for performing automated data protection with information technology (IT) infrastructure visibility. The method comprises receiving input regarding a desired state of a data protection environment for an IT infrastructure and creating a data protection environment according to the desired state of the data protection environment.

22 Claims, 20 Drawing Sheets

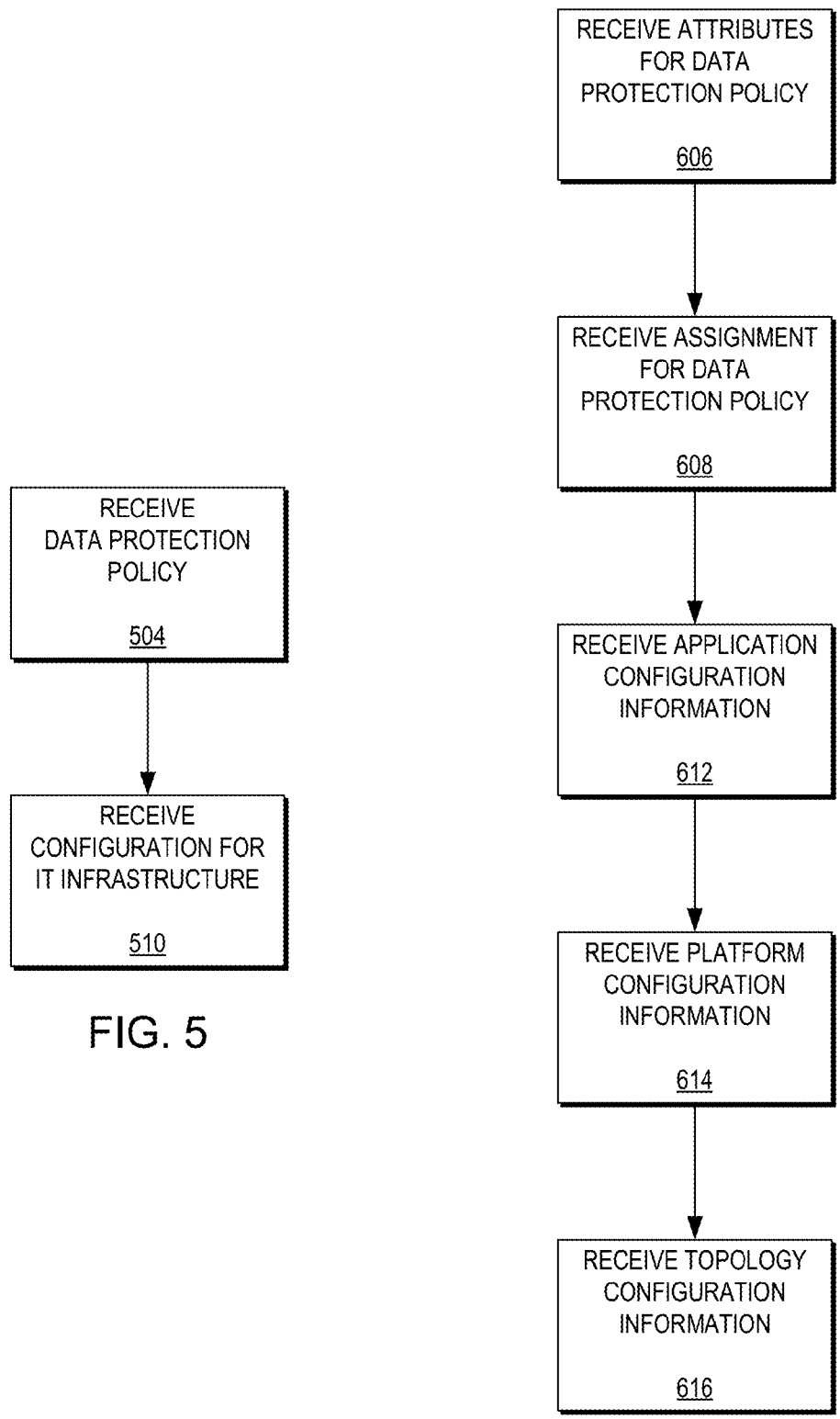

FIG. 18

METHOD AND APPARATUS FOR AUTOMATED DATA PROTECTION WITH IT INFRASTRUCTURE VISIBILITY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

This application is related to co-pending U.S. patent application Ser. No. 13/174,314 entitled "METHOD AND APPARATUS FOR POLICY-BASED REPLICATION" filed on Jun. 30, 2011, the contents of which are incorporated herein by reference in their entirety.

TECHNICAL FIELD

This application relates to data protection.

BACKGROUND

Data protection (e.g., replication) may be provided by a data protection process that makes a copy of an original set of data at target devices. The copy of data may be used upon the occurrence of an event causing data failure such as may occur, for example, when the original copy of data is destroyed, corrupted, or otherwise unavailable. Different strategies may be used to provide data protection for different types of failures that can occur. A data protection policy (DPP) may be designed to meet data protection criteria or objectives determined in a variety of different ways. Such criteria may be specified in a service level agreement (SLA), by management or administrators, and the like. Once designed, the data protection policy may then be implemented.

SUMMARY

Example embodiments of the present invention provide a method, an apparatus, and a computer program product for performing automated data protection with information technology (IT) infrastructure visibility. The method comprises receiving input regarding a desired state of a data protection environment for an IT infrastructure and creating a data protection environment according to the desired state of the data protection environment.

BRIEF DESCRIPTION OF THE DRAWINGS

The above and further advantages of the present invention may be better under stood by referring to the following description taken into conjunction with the accompanying drawings in which:

FIG. 5 is a flow diagram illustrating an example method for receiving input regarding a desired state of a data protection environment according to an example embodiment of the present invention;

FIG. 6 is a flow diagram illustrating an example method for receiving data protection policy information and receiving configuration information for an IT infrastructure according to an example embodiment of the present invention;

FIGS. 14-24 are screenshots of a user interface according to example embodiments of the present invention;

DETAILED DESCRIPTION

Figure 1:
FIG. 1 is a simplified block diagram illustrating a service plan manager according to an example embodiment of the present invention.

IT organizations are challenged with maintaining data application and availability while satisfying service level agreements and compliance requirements. Unprecedented data growth is straining IT resources requiring greater investments, while capital and operational expenses are under scrutiny. Given this tension, IT organizations are seeking efficiency and optimization to regain control and meet business SLAs.

The combination of server consolidation through virtualization and increasing use of pool-based storage has changed the paradigm for storage management. Applications are less often tied to individual disk spindles, and instead there are several layers of abstraction in the mapping to applications to disk. These layers of abstraction give storage administrators more flexibility to manage capacity and balance workloads, but at a price of increased complexity. It is no longer good enough to use replication of disk spindles as a proxy for protecting application. IT needs to manage application service levels via a top-down approach that starts with application awareness, and needs the system to manage the mapping to storage.

This change in the storage management paradigm calls for increased levels of automation in the management of distributed replication processes. This increased level of workflow and management automation requires policy (i.e., service plan) creation, monitoring and enforcement, and support for application level integration. URM is about improved levels of replication management through policy controls and automation of protection tasks of customers' applications. These functions are typically found in traditional backup application and are moving to the replication.

Example embodiments of the present invention enable the automation of application level policy management and configuration of data protection and disaster recovery. At its core, is a policy engine enabling a common user interface (UI) that works across various replications technologies to provide policy configuration, resource pool creation, analytics and automated execution of configured protection and disaster recovery policies. Example embodiments of the present invention address the following:

Manual Process Automation: Example embodiments of the present invention free administrators from manually (or scripting) tracking, monitoring, scheduling and ensuring that application recoverability service levels are being met for thousands of LUNS and volumes across hundreds of systems by automating these tasks.

Recovery Risk Management: Example embodiments of the present invention manage existing protection policies by automatically discovering unprotected data and applying a protection policy to mitigate risk.

Increased Visibility: IT environments include many systems, applications, people, tools, and backup technologies. Example embodiments of the present invention consolidate these views into a single framework, a comprehensive view of the data protection environment. The UI maps applications, hosts to volumes and detects existing relationships.

Simplification: Example embodiments of the present invention provide a UI that masks the complexity of configuring and managing underlying tasks such as snapshot creation, provisioning, and data movement. Example embodiments of the present invention enable the server, application and storage administrators to think about protecting their environment without the burden of storage level tasks.

Compliance metrics: Traditional protection processes are error prone requiring the need for recovery testing. URM provides a centralized, policy driven management environment for distributed, heterogeneous replicas and monitoring, tracking, and analysis of protection vulnerabilities. Example embodiments of the present invention ensure the customer is in compliance of business rules and will identify protection gaps.

Management of business requirements: Customers manage replication of applications and its infrastructure based on their business needs defined by Service Level Agreements (SLAs). Example embodiments of the present invention automate workflows to achieve SLAs, and identifies SLAs failures so the administrators can take corrective actions.

Figure 4:
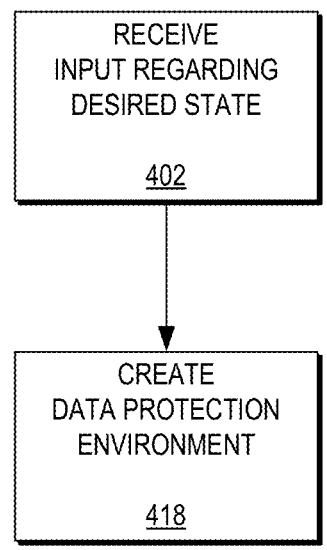
FIG. 4 is a flow diagram illustrating an example method for performing automated data protection according to received input regarding a desired state of the data protection environment according to an example embodiment of the present invention.

FIG. 1 is a simplified block diagram illustrating a service plan manager 100 according to an example embodiment of the present invention. FIG. 1 may be studied in combination with the flow diagram of FIG. 4 illustrating an example method for performing automated data protection according to received input regarding a desired state of the data protection environment according to an example embodiment of the present invention. As illustrated in FIGS. 1 and 4, and will be described in greater detail below, the service plan manager 100 may receive input regarding a desired state of a data protection environment for an information technology (IT) infrastructure (e.g., managed entities 260) (402) and create a data protection environment according to the desired state of the data protection environment (418).

Figure 2:
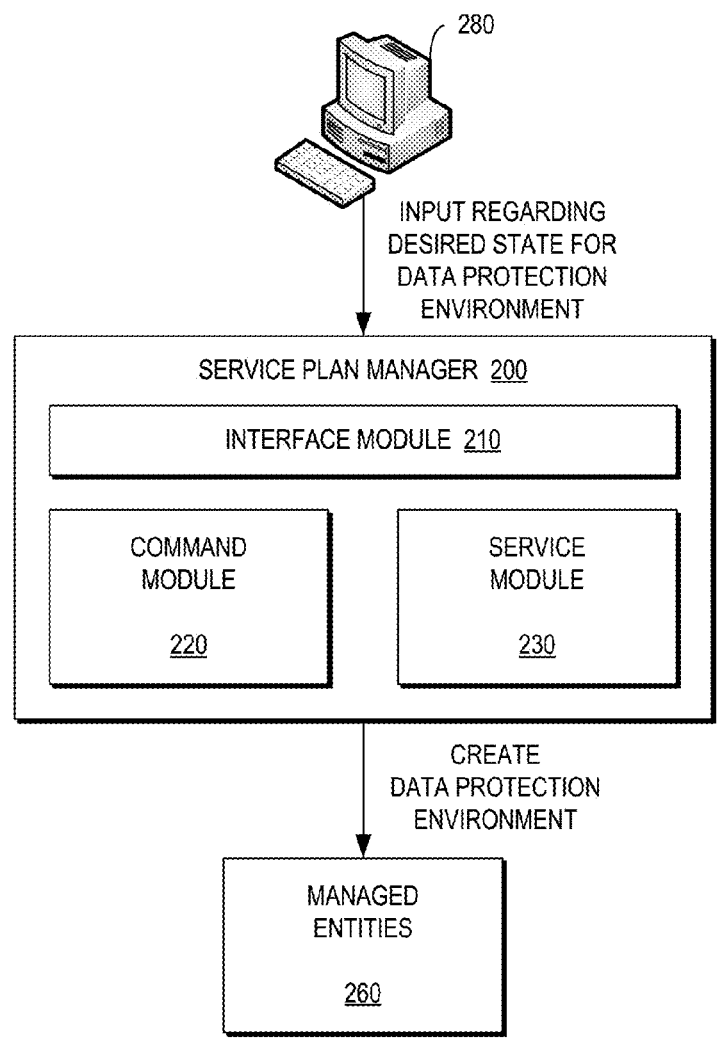
FIG. 2 is a simplified block diagram illustrating a service plan manager, including an interface module, a command module, and a service module, according to an example embodiment of the present invention configured to receive input regarding a desired state for a data protection environment and create the data protection environment.

FIG. 2 is a simplified block diagram illustrating a service plan manager 200, including an interface module 210, a command module 220, and a service module 230, according to an example embodiment of the present invention. The interface module 210 may be configured to receive input regarding a desired state for a data protection environment, such as via a user interface 280. It should be understood that the interface module 210 also may receive input regarding a desired state for a data protection environment internally, such as following an analysis of the data protection environment, as will be described below in greater detail with reference to FIGS. 10-12. Moreover, as will be described below in greater detail, the command module 220 and the service module 230, in combination, may create the data protection environment.

In certain embodiments, the command module 220 may issue synchronous commands in which the command module 220 calls a method provided by the service module 230 and waits until the service is complete. In other embodiments, the command module 220 may issue asynchronous commands in which the command module 220 provides a queue for the service module 230, calls methods provided by the service module 230 and returns. The service module picks up commands from the queue, satisfies them, and publishes a response to the command to the queue.

Figure 3:
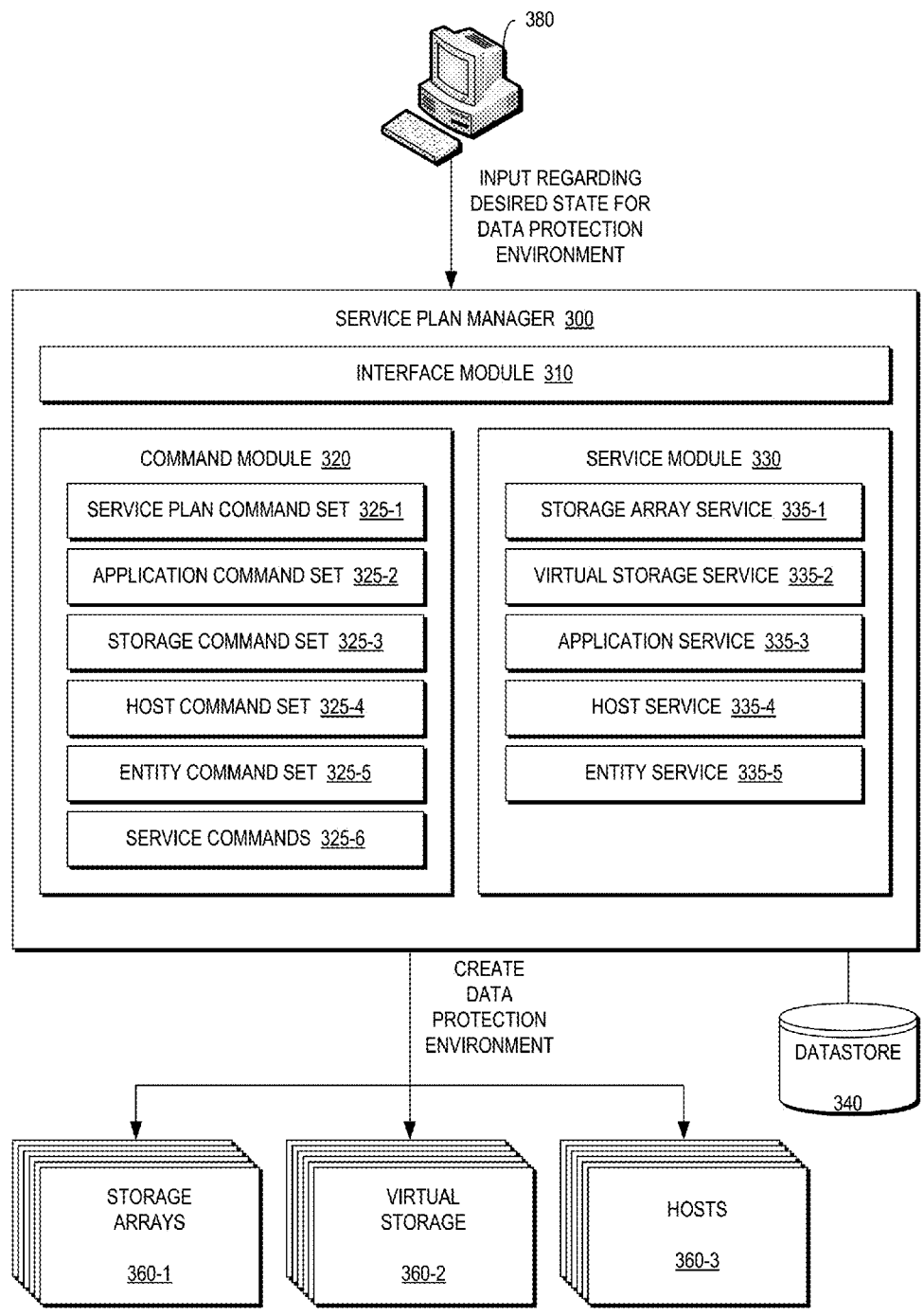
FIG. 3 is a block diagram illustrating a service plan manager according to an example embodiment of the present invention, including a plurality of command sets and services for creating a data protection environment.

FIG. 3 is a block diagram illustrating a service plan manager 300 according to an example embodiment of the present invention. As illustrated in FIG. 3, the service plan manager 300 includes an interface module 310, a command module 320, and a service module 330. As described above with reference to FIG. 2, the interface module 310 may be configured to receive input regarding a desired state for a data protection environment, such as via a user interface 380. It should be understood that the interface module 310 also may receive input regarding a desired state for a data protection environment internally, such as following an analysis of the data protection environment, as will be described below in greater detail with reference to FIGS. 10-12.

The command module 320 may include a plurality of command sets (e.g., service plan command set 325-1, application command set 325-2, storage command set 325-3, host command set 325-4 entity command set 325-5) (325, generally). Command sets either sit on top of services to provide a more convenient interface to the service or knit services together to provide the business logic required to perform heterogeneous operations.

Service plan command set 325-1: The service plan commands tie all of the other commands together to perform long running activities like creating protection sets of applications, mounting replicas and restoring. It acts on any combination of applications and storage types.

Application command set 325-2: Application commands contain the business logic required to do various application operations. For example, in order to provide protection for an application, example embodiments of the present invention need to translate application objects in to file system objects that can then be replicated for protection. Each application command set knows how to do this translation for its application. Likewise, for restoring an application from a previously created protection set, application commands know how to recover the application after a host based restore is completed.

Storage command set 325-3: The storage command set performs storage related operations. Commands to create array based snapshots or bookmarks reside here. Storage commands are also responsible for doing LUN based restore operations.

Host Command set 325-4: The Host command set is responsible for performing operations related to hosts and file systems residing on hosts. For example, the host commands would be able to translate a file system in to the LUN it resides on. Host commands would also be responsible for doing any host related operation after a restore, such as surfacing LUNs and assigning drive letters.

Entity command set 325-5: The entity command provides database queries for the datastore 340. It is broken down by entity type. Common methods exist for each entity such as getting the entity by a universally unique identifier (UUID), getting the entity by name and getting a list of all entities of a particular type. Each entity type may also have entity commands that perform specific queries related to only that type.

Service commands 325-6: Service commands provide an interface to external modules that example embodiments of the present invention use to perform operations on storage arrays or production hosts. These external modules may run as separate processes on remote hosts or may be run on the same host hosting example embodiments of the present invention.

The service module 330 may include a plurality of services (e.g., storage array service 335-1, virtual storage service 335-2, application service 335-3, host service 335-4 and entity service 335-5) (335, generally) for creating a data protection environment. Services perform simple operations related to external modules such as hosts, storage arrays and application providers. In certain embodiments, each service is self contained and does not know about other services or the commands. In other embodiments services contain no business logic.

Storage array service 335-1 and virtual storage service 335-2: Services that do storage array operations (one per support storage platform).

Application service 335-3: Services that perform application specific operations (one per supported application)

Host service 335-4: Services that perform host services.

Entity service 335-5: Services that perform database operations for the datastore 340.

Accordingly, as will be described below in greater detail, with policy specifications and the analysis logic in place, the service plan manager 300 can intelligently modify physical and scheduling resources to bring policy violations back into compliance automatically.

Service plans generated by the service plan manager 300 may be stored to a datastore 340. This allows the best practices for managing a given application type to be shipped with example embodiments of the present invention, thereby reducing the amount of user intervention needed to start a series of protection or repurposing steps. Further, customers that need more complex protocols can start with built-in service plans and customize them for their own needs or reuse them as templates that can be created and distributed to administrators.

FIGS. 5 and 6 may be studied in conjunction.

FIG. 5 is a flow diagram illustrating an example method for receiving input regarding a desired state of a data protection environment according to an example embodiment of the present invention (e.g., 402 of FIG. 4). As illustrated in FIG. 5, the interface module 310 may receive a data protection policy for the IT infrastructure (e.g., arrays 360-1, virtual arrays 360-2, and hosts 360-3 of FIG. 3) (504). The interface module 310 also may receive a configuration for the IT infrastructure (510).

FIG. 6 is a flow diagram illustrating an example method for receiving data protection policy information and receiving configuration information for an IT infrastructure according to an example embodiment of the present invention. As illustrated in FIG. 6, to receive a data protection policy for the IT infrastructure (504), the interface module 310 may receive attributes for the data protection policy for the IT infrastructure (606) and receive an assignment for the data protection policy for the IT infrastructure (608). Further, to receive a configuration for the IT infrastructure (510), the interface module 310 may receive configuration information regarding applications in the IT infrastructure (612), receive configuration information regarding platforms in the IT infrastructure (614), and receive configuration information regarding network topology in the IT infrastructure (616).

Figure 9:
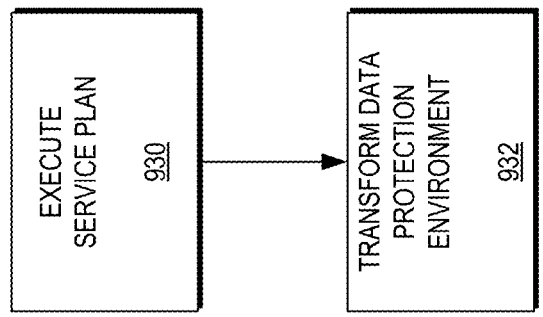
FIG. 9 is a flow diagram illustrating an example method for creating a data protection environment according to a generated service plan according to an example embodiment of the present invention.
Figure 8:
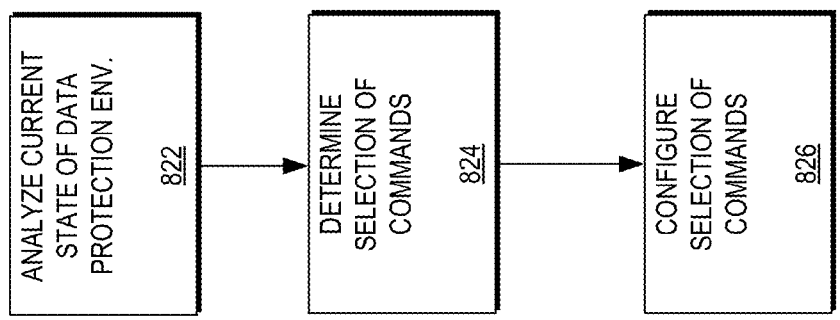
FIG. 8 is a flow diagram illustrating an example method for generating a service plan according to received input regarding a desired state of the data protection environment according to an example embodiment of the present invention.
Figure 7:
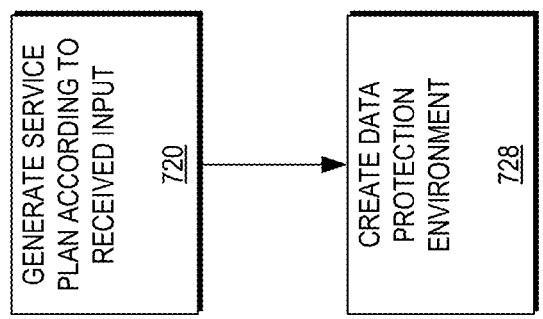
FIG. 7 is a flow diagram illustrating an example method for creating a data protection environment according to an example embodiment of the present invention.

FIGS. 7-9 may be studied in conjunction.

FIG. 7 is a flow diagram illustrating an example method for creating a data protection environment according to an example embodiment of the present invention (e.g., 418 of FIG. 4). As illustrated in FIG. 7, the command module 320 may generate a service plan according to the input regarding the desired data protection environment (720). The service module 330 then may create the data protection environment according to the service plan (728).

FIG. 8 is a flow diagram illustrating an example method for generating a service plan according to received input regarding a desired state of the data protection environment according to an example embodiment of the present invention. As illustrated in FIG. 8, to generate a service plan according to the input regarding the desired data protection environment (720), the command module 320 may analyze a current state of the data protection environment (822). In certain embodiments, to analyze a current state of the data protection environment (822), the command module 320 may determine whether a current state of the data protection environment conforms to the desired state of the data protection environment.

Further, the command module 320 may determine a selection of commands to transform the data protection environment to the desired state of the data protection environment to conform to the received input (824). For example, the command module 320 may determine the selection of commands from a plurality of commands sets (e.g., service plan command set 325-1, application command set 325-2, storage command set 325-3, host command set 325-4 entity command set 325-5) (325, generally) to transform the current state of the data protection environment to the desired state of the data protection environment to conform to the received input if the current state of the data protection environment does not conform to the desired state of the data protection environment.

In certain embodiments, to determine a selection of commands to transform the data protection environment to the desired state of the data protection environment to conform to the received input (824), the command module 320 may determine a selection of commands to transform the current state of the data protection environment to the desired state of the data protection environment to conform to the received input if the current state of the data protection environment does not conform to the desired state of the data protection environment.

The command module 320 then may configure the selection of commands (826). In certain embodiments, to configure the selection of commands, the command module 320 may configure the selection of commands to transform the data protection environment from the current state of the data protection environment to the desired state of the data protection environment to conform to the received input.

FIG. 9 is a flow diagram illustrating an example method for creating a data protection environment according to a generated service plan according to an example embodiment of the present invention. As illustrated in FIG. 9, to create a data protection environment according to a generated service plan, the service module 330 may execute the service plan (930). In certain embodiments, to execute the service plan (930), the service module 330 may direct a plurality of services according to the service plan to transform the data protection environment from the current state of the data protection environment to the desired state of the data protection environment. For example, the service module 330 may direct each service of the plurality of services (e.g., storage array service 335-1, virtual storage service 335-2, database service 335-3, host service 335-4 and entity service 335-5) (335, generally) according to respective commands selected from a respective command set 325 to transform the data protection environment from the current state of the data protection environment to the desired state of the data protection environment.

The service module 330 then may transform the data protection environment from the current state of the data protection environment to the desired state of the data protection environment according to the service plan (932).

Not only may example embodiments of the present invention initialize a data protection environment as described above, example embodiments of the present invention also may monitor a data protection environment for deviations from a desired state of the data protection environment and remedy the deviation, as will be set out below.

Figure 10:
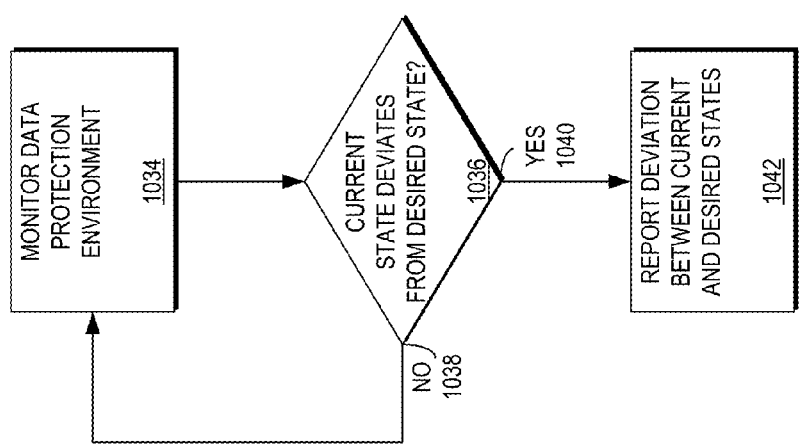
FIG. 10 is a flow diagram illustrating an example method for monitoring a data protection environment and reporting a deviation between current and desired states of the data protection environment according to an example embodiment of the present invention.

FIG. 10 is a flow diagram illustrating an example method for monitoring a data protection environment and reporting a deviation between current and desired states of the data protection environment according to an example embodiment of the present invention. As illustrated in FIG. 10, in addition to receiving input regarding a desired state of a data protection environment for an information technology (IT) infrastructure (402) and creating a data protection environment according to the desired state of the data protection environment (418), the command module 320 in example embodiments of the present invention may monitor the data protection environment (1034) and determine whether a current state of the data protection environment deviates from the desired state of the data protection environment (1036).

With policy specifications defined in the datastore 340, the monitoring and analysis of the data protection environment's compliance to the service plan is possible. If the current state of the data protection environment does not deviate from the desired state of the data protection environment (1038), the command module 320 may continue to monitor the data protection environment (1034). However, if the current state of the data protection environment does deviate from the desired state of the data protection environment (1040), the command module may report the deviation between the current state of the data protection environment and the desired state of the data protection environment to a user (1042). For example, alerts can be sent when certain targets fall out of compliance and reports can be generated to look at historical compliance patterns and issues.

It should be understood that, as will be described below in greater detail with reference to FIG. 12, the initializing and monitoring processes provided by the command module 320 may run in parallel such that changes received by the interface module 310 may cause the desired state of the data protection environment to change such that the command module 320 generates a service plan.

Figure 11:
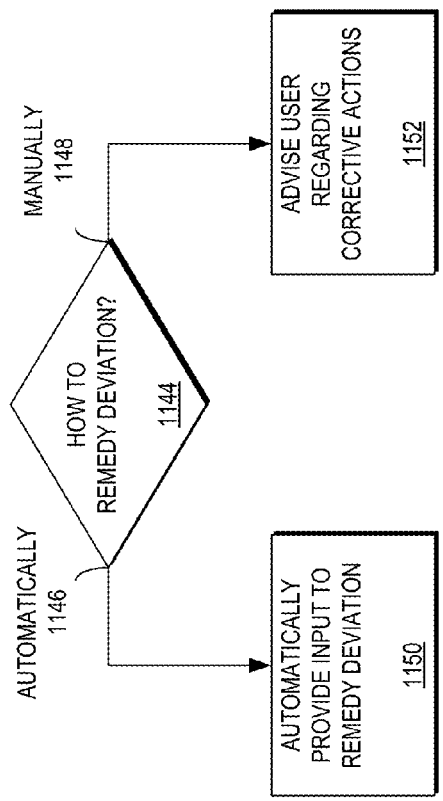
FIG. 11 is a flow diagram illustrating an example method for remedying a deviation between current and desired states of the data protection environment according to an example embodiment of the present invention.

FIG. 11 is a flow diagram illustrating an example method for remedying a deviation between current and desired states of the data protection environment according to an example embodiment of the present invention. As illustrated in FIG. 11, the command module 320 may determine how to remedy the deviation (1144) (e.g., automatically or manually). In certain embodiments, if service plans are available in the datastore 340 to remedy the deviation, the command module 320 may implement those service plans automatically. Otherwise, if compliant service plans are not available, the command module 320 may require user intervention via manual remedying of the deviation. Therefore, if the command module 320 elects to remedy the deviation automatically (1146), the command module 320 automatically provides input to remedy the deviation between the current state of the data protection environment and the desired state of the data protection environment (1150). This input may be received (402) as described above with reference to FIG. 4.

Likewise, if the command module 320 elects to remedy the deviation manually (1148), the command module 320 may advise a user regarding corrective actions to remedy the deviation between the current state of the data protection environment and the desired state of the data protection environment (1152). The user then may provide input to remedy the deviation, which may be received (402) as described above with reference to FIG. 4.

Figure 12:
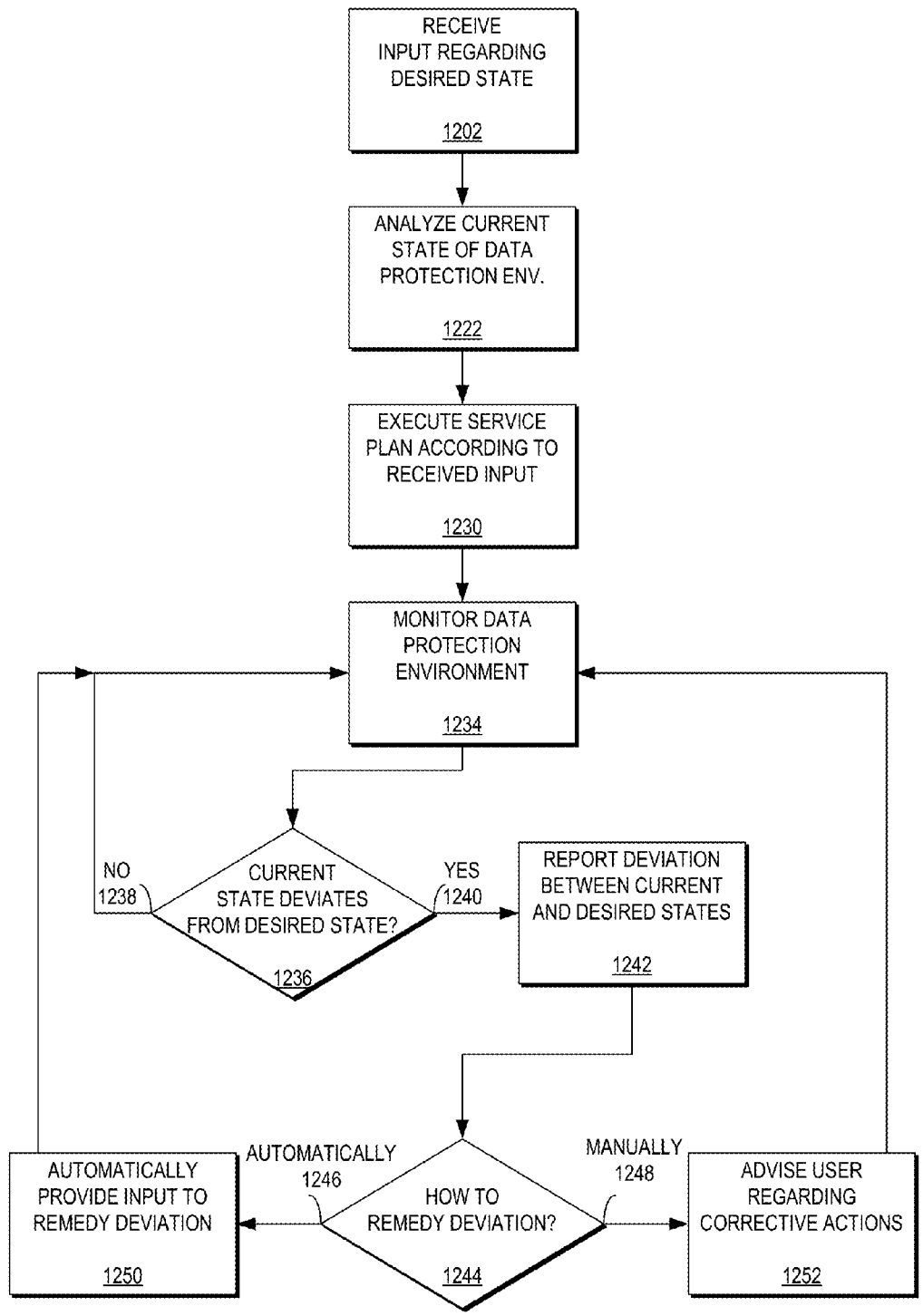
FIG. 12 is a flow diagram illustrating an example method for initializing and monitoring a data protection environment according to an example embodiment of the present invention.

FIG. 12 is a flow diagram illustrating an example method for initializing and monitoring a data protection environment according to an example embodiment of the present invention. The flow diagram of FIG. 12 may be studied in conjunction with FIG. 13, which is a simplified block diagram illustrating a storage array at different times and the initialization, monitoring, and remedying of the data protection environment therein according to an example embodiment of the present invention.

The service plan manager 300 may receive input regarding a desired state of a data protection environment for an IT infrastructure (1202). For example, the received input may specify that a storage array 1350 that includes a first primary volume (i.e., primary 1) 1360 and a second volume (i.e., primary 2) 1370 is to have three replica copies of each volume (i.e., replica 1-1, replica 1-2, replica 1-3 1360-1-1360-3 and replica 2-1, replica 2-2, replica 2-3 1370-1-1370-3). The command module 320 may analyze a current state of the data protection environment (1222) and determine that there are no replica copies. Therefore, the service module 330 may execute a service plan according to the received input (1230) to provide three replica copies of each volume.

Figure 13:
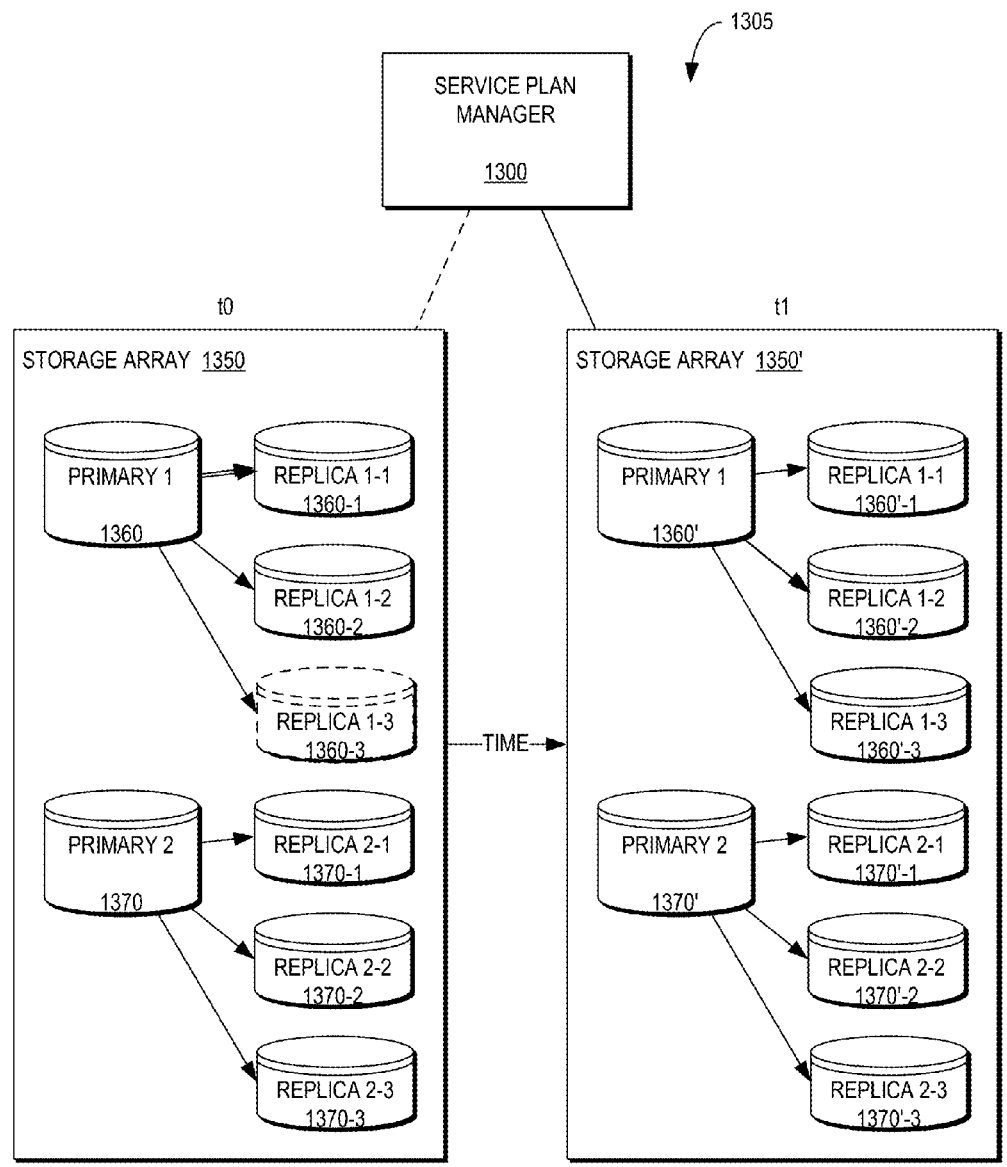
FIG. 13 is a simplified block diagram illustrating a storage array at different times and the initialization, monitoring, and remedying of the data protection environment therein according to an example embodiment of the present invention.

The command manager 310 then may monitor the data protection environment (1234) and determine whether a current state of the data protection environment deviates from the desired state of the data protection environment. As illustrated in FIG. 13 at time t0, replica 1-3 1360-3 has failed or is unavailable. Accordingly, the command module 320 determines that the current state of the data protection environment (i.e., replica 1-3 1360-3 has failed or is unavailable) deviates from the desired state of the data protection environment (i.e., three replicas for both volumes) (1240). The interface module 310 then may report the deviation between the current state of the data protection environment and the desired state of the data protection environment to a user (1242), such as to an administrator.

The command module 320 then may determine how to remedy the deviation (1244). For example, to automatically remedy the deviation (1246), the command module 320 may have a service plan stored in the datastore 340 which the command module 320 may provide as input to remedy the deviation by automatically provisioning replicas to replace the failed third replica for volume 1 (1246). Alternatively, the command module 320 may determine that manual remediation (1248) is necessary and may advise a user regarding corrective actions to remedy the deviation between the current state of the data protection environment and the desired state of the data protection environment (e.g., the user needs to provision a third replica of the first volume) (1252). Therefore, as illustrated in FIG. 13 at time t1, the data protection environment of the storage array 1350' again includes three replica copies of each volume (i.e., replica 1-1, replica 1-2, replica 1-3 1360'-1-1360'-3 and replica 2-1, replica 2-2, replica 2-3 1370'-1-1370'-3).

Regardless of which remedy is performed (i.e., automatic or manual), the command module 320 continues to monitor the data protection environment (1234). Accordingly, the command module 320 determines that the current state of the data protection environment (i.e., replica 1-3 1360'-3 is in place) does not deviate from the desired state of the data protection environment (i.e., three replicas for both volumes) (1238). The command module 320 then may continue to monitor the data protection environment (1234). It should be understood that the initializing and monitoring processes provided by the command module 320 may run in parallel such that changes received by the interface module 310 may cause the desired state of the data protection environment to change such that the command module 320 generates a service plan.

FIGS. 14-24 are screenshots of a user interface according to example embodiments of the present invention, such as automated protection of VMware vCenters.

Figure 14:
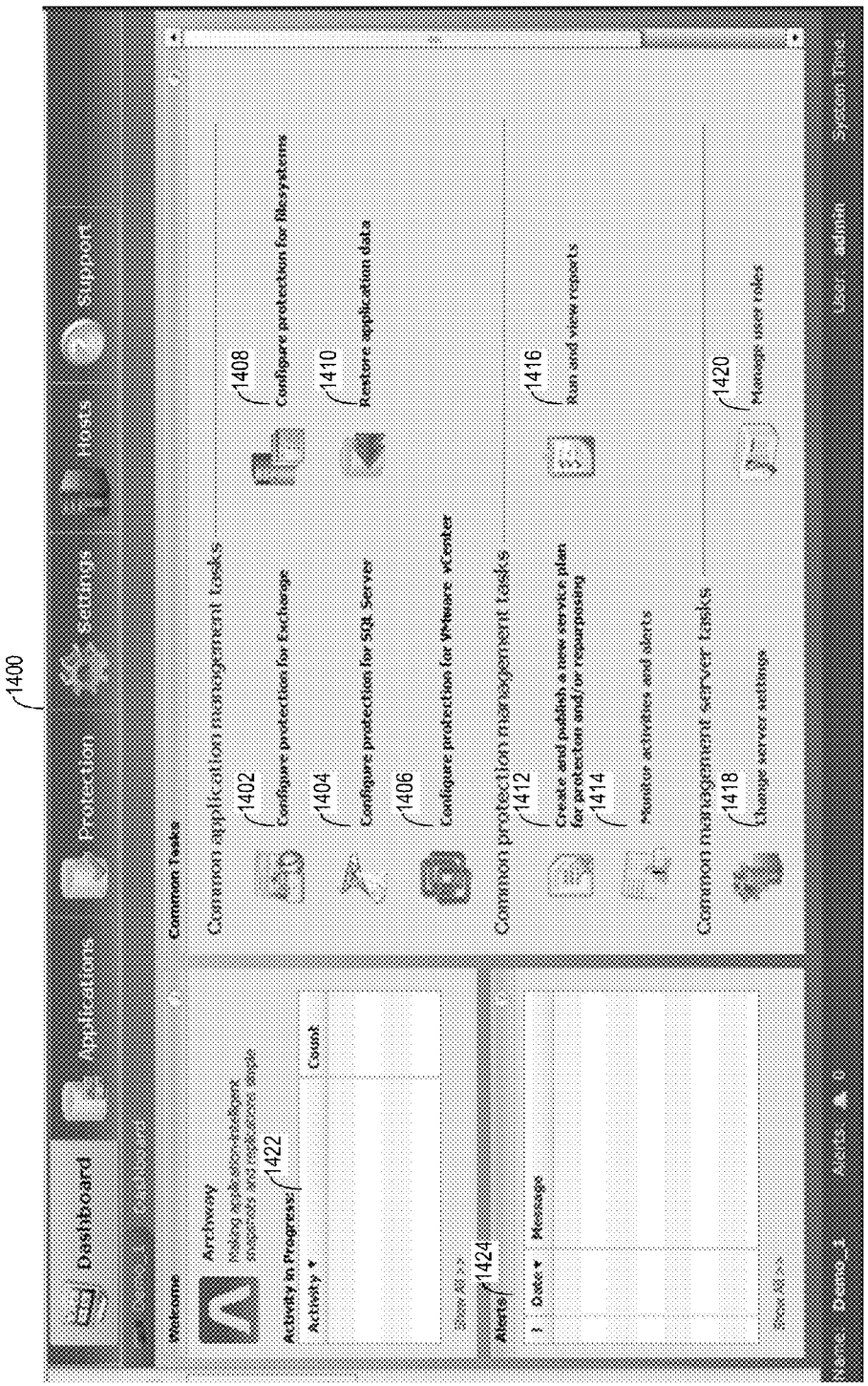

FIG. 14 is a screenshot of a user interface dashboard 1400 for initializing and monitoring a data protection environment. As illustrated in FIG. 14, example embodiments of the present invention allow configuration of data protection environments for Microsoft Exchange 1402, SQL Server 1404, VMware vCenter 1406, and filesystems 1408, as well as providing for restoration of application data 1410. The dashboard 1400 also allows a user easy access to common protection management tasks, such as create and publish a new service plan for protection and/or repurposing 1412 (e.g., such as to the datastore 340), monitor all activities and alerts 1414, and run and view reports 1416. Common management server tasks, such as change server settings 1418 and manage user roles 1420, are provided. The dashboard 1400 also illustrates various activities currently in progress 1422 and alerts 1424.

Figure 15:
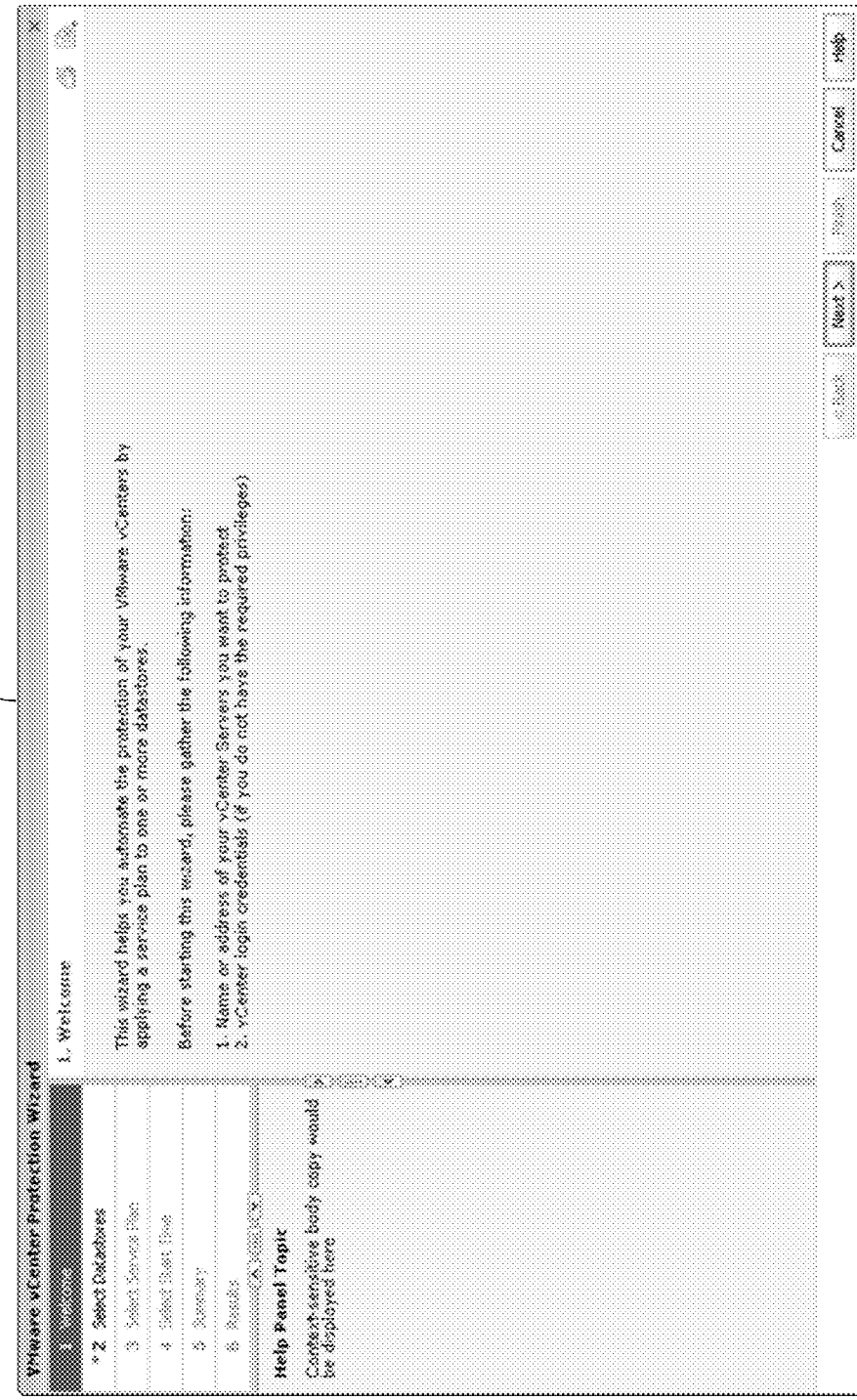

FIG. 15 is a screenshot illustrating a welcome screen 1500 explaining the automatic protection of VMware vCenters and the information required to initialize the protection.

Figure 16:
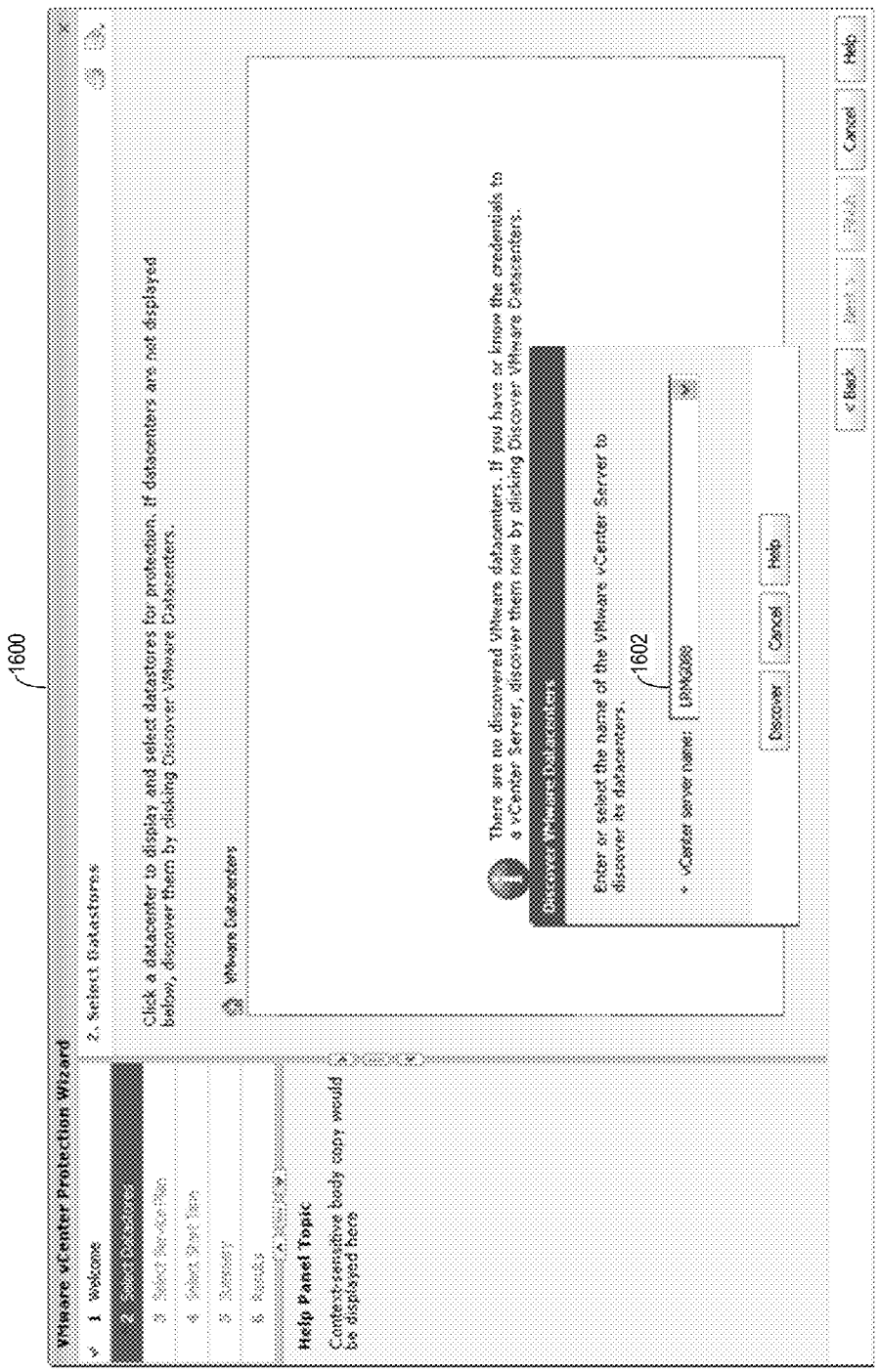

FIG. 16 is a screenshot illustrating a datastore selection identification screen 1600 allowing a user to enter a vCenter server name for discovery of its datacenters.

Figure 17:
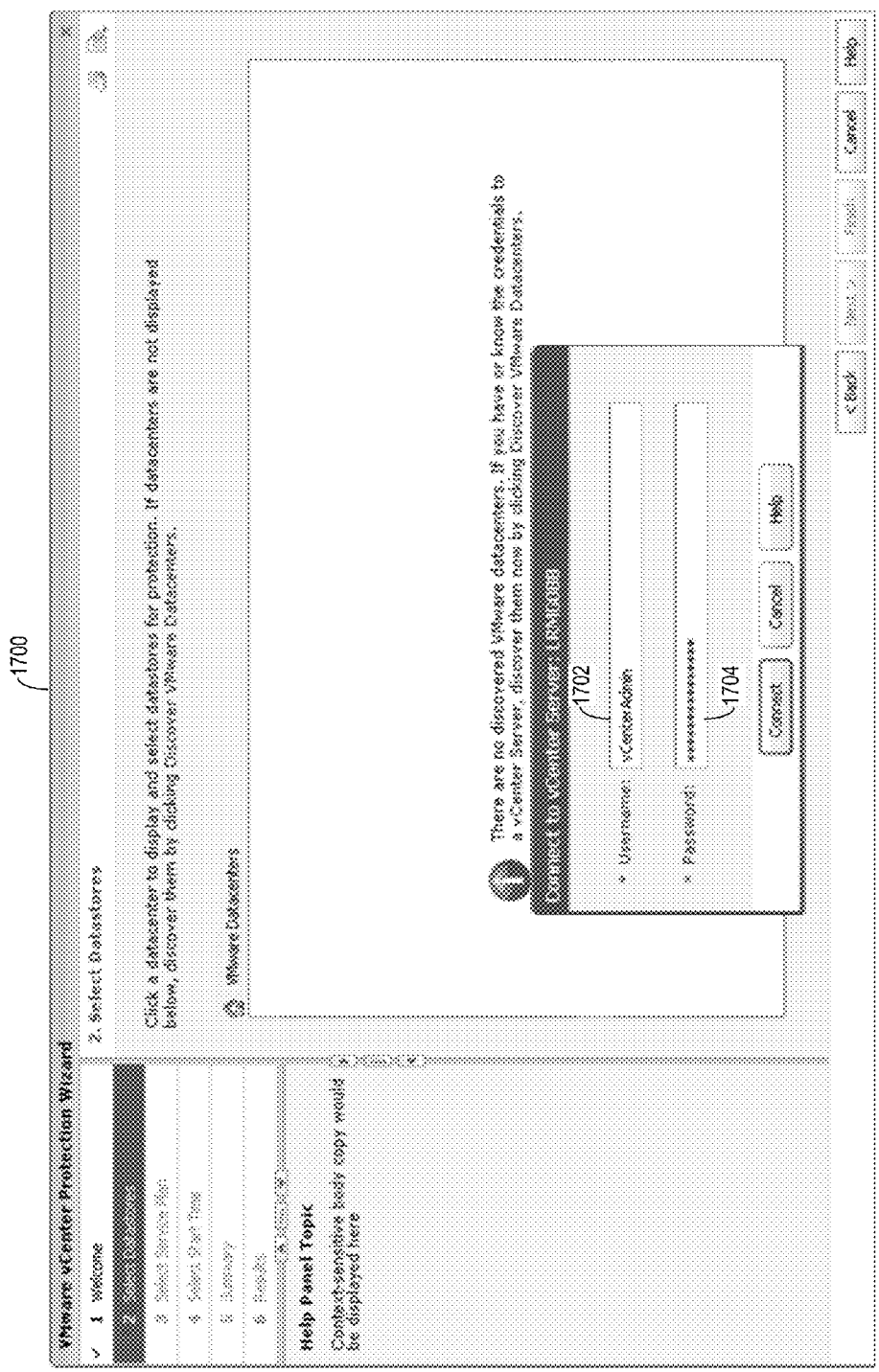

FIG. 17 is a screenshot illustrating a datastore selection credentials screen 1700 allowing a user to provide a username and password for connecting to the vCenter server specified in FIG. 16.

Figure 18:
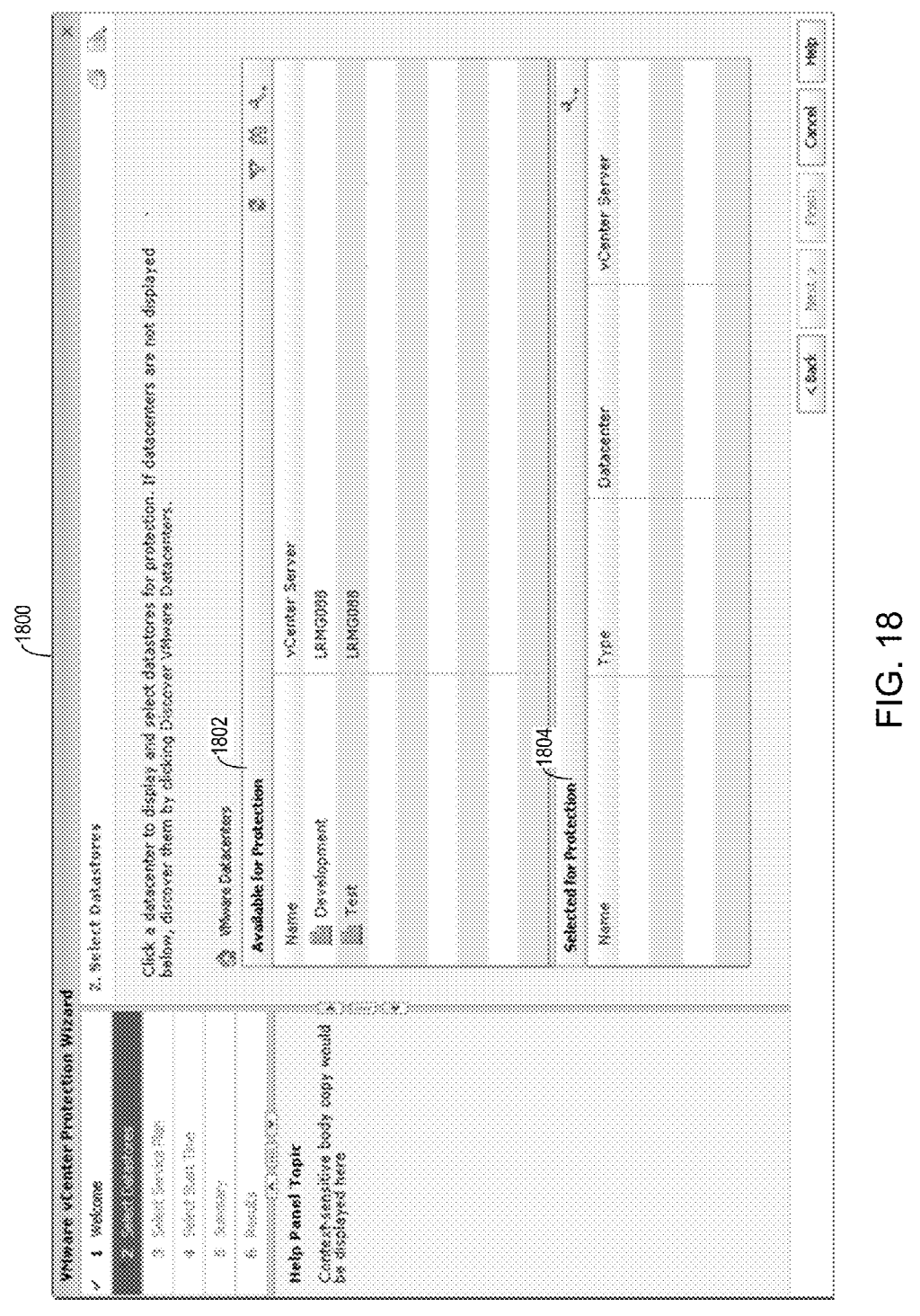

FIG. 18 is a screenshot illustrating a datacenter selection screen 1800 displaying available VMware datacenters 1802 and allowing a user to provide a selection of one or more datacenters for protection 1804.

Figure 19:
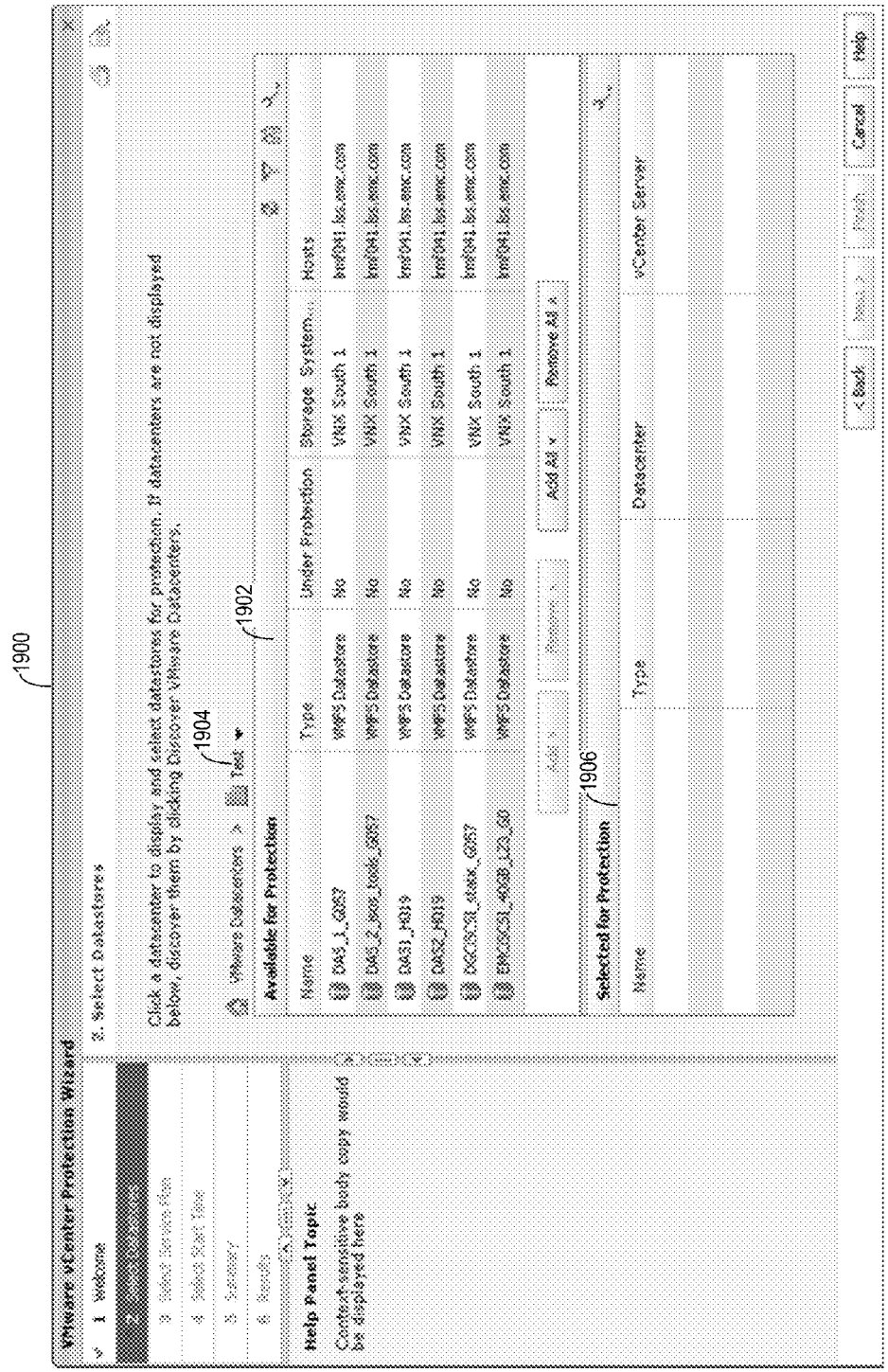

FIG. 19 is a screenshot illustrating a datastore selection screen 1900 displaying VMware datastores available for protection 1902 of the selected datacenter 1904 and allowing a user to provide a selection of one or more datastores for protection 1906.

Figure 20:
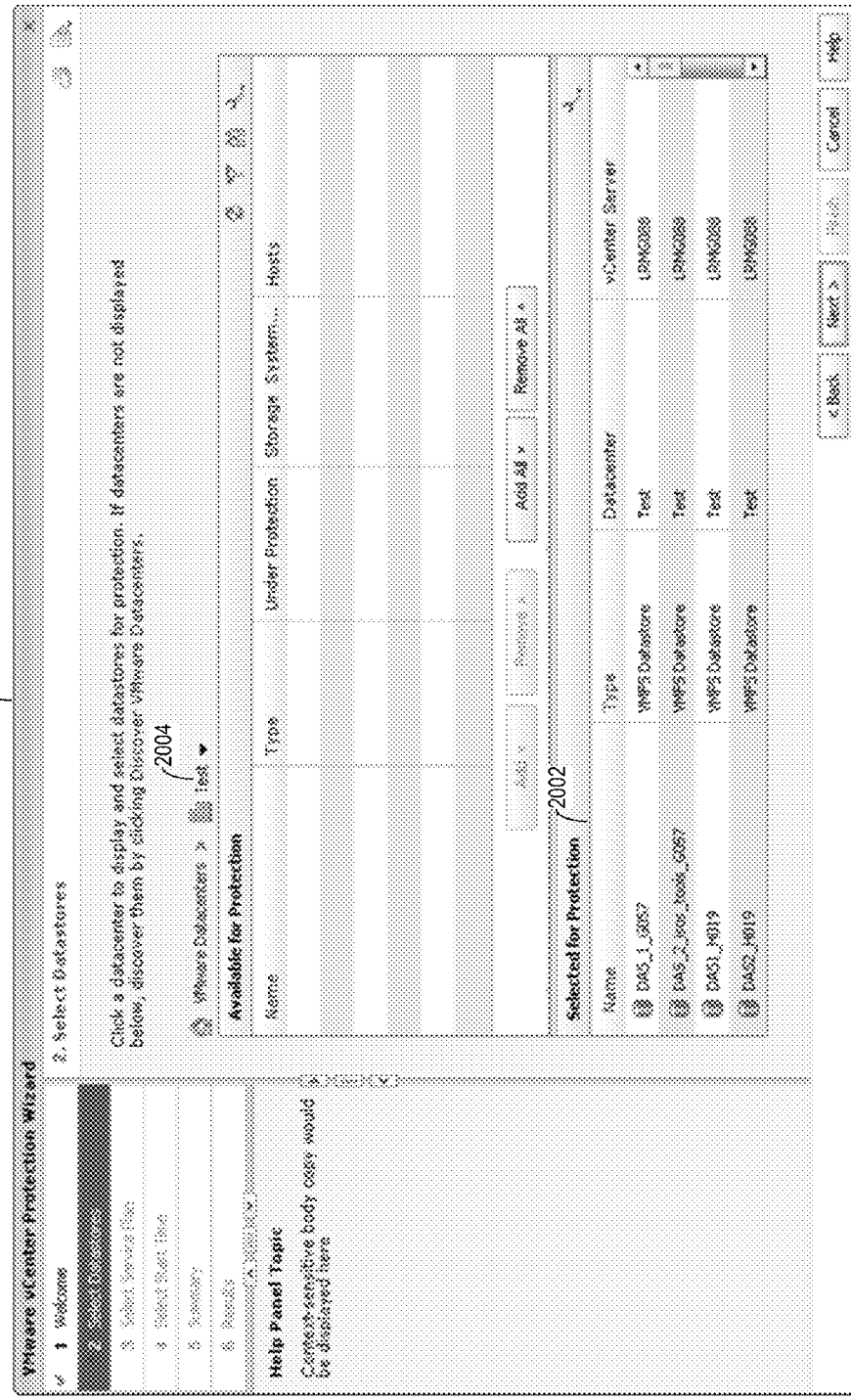

FIG. 20 is a screenshot illustrating a datastore selection screen 2000 displaying VMware datastores selected for protection 2002 of the selected datacenter 2004.

Figure 21:
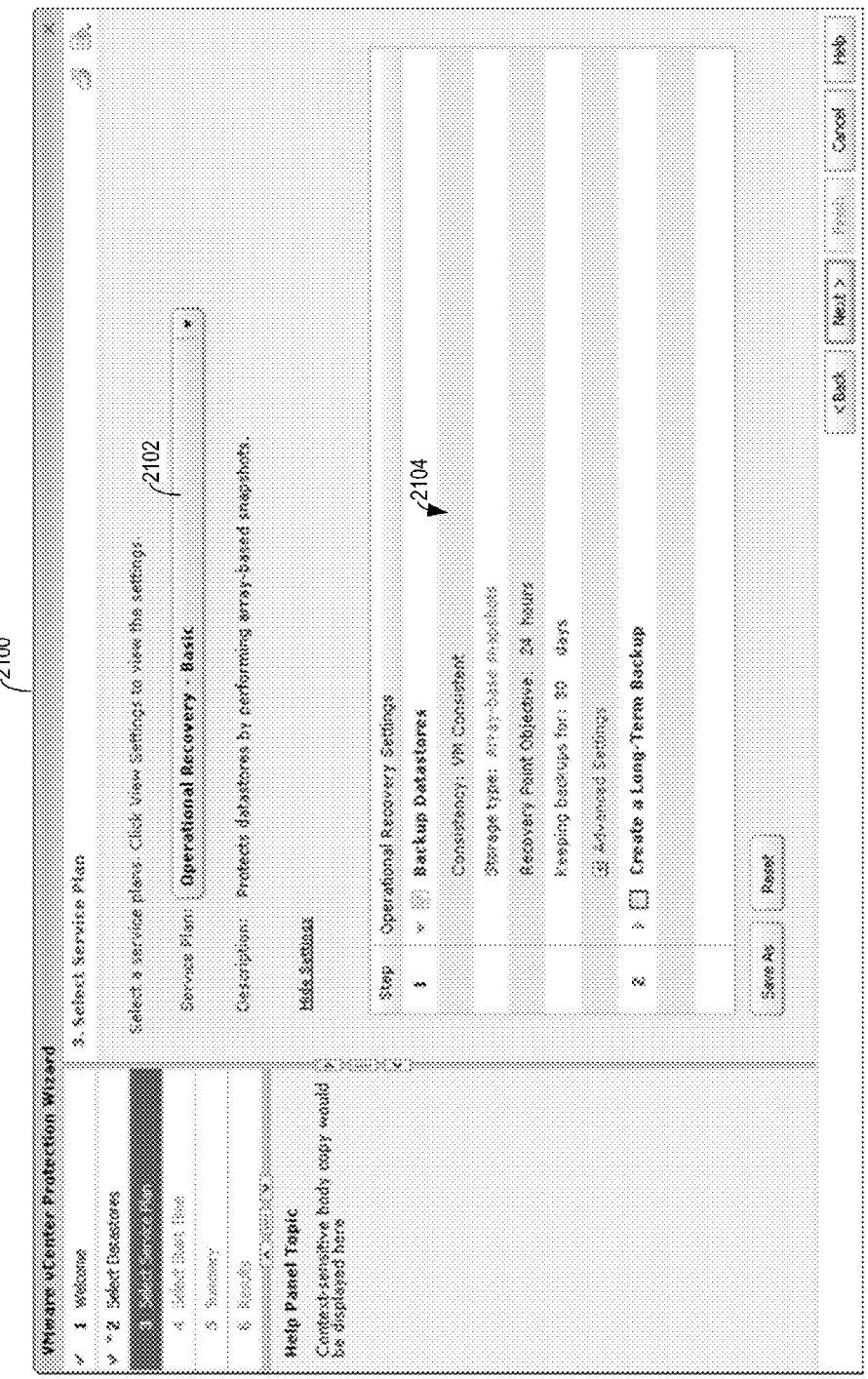

FIG. 21 is a screenshot illustrating a service plan selection screen 2100 displaying predefined service plans 2102 available for selection (e.g., such as from the datastore 340) and various user-modifiable settings provided therein 2104.

Figure 22:
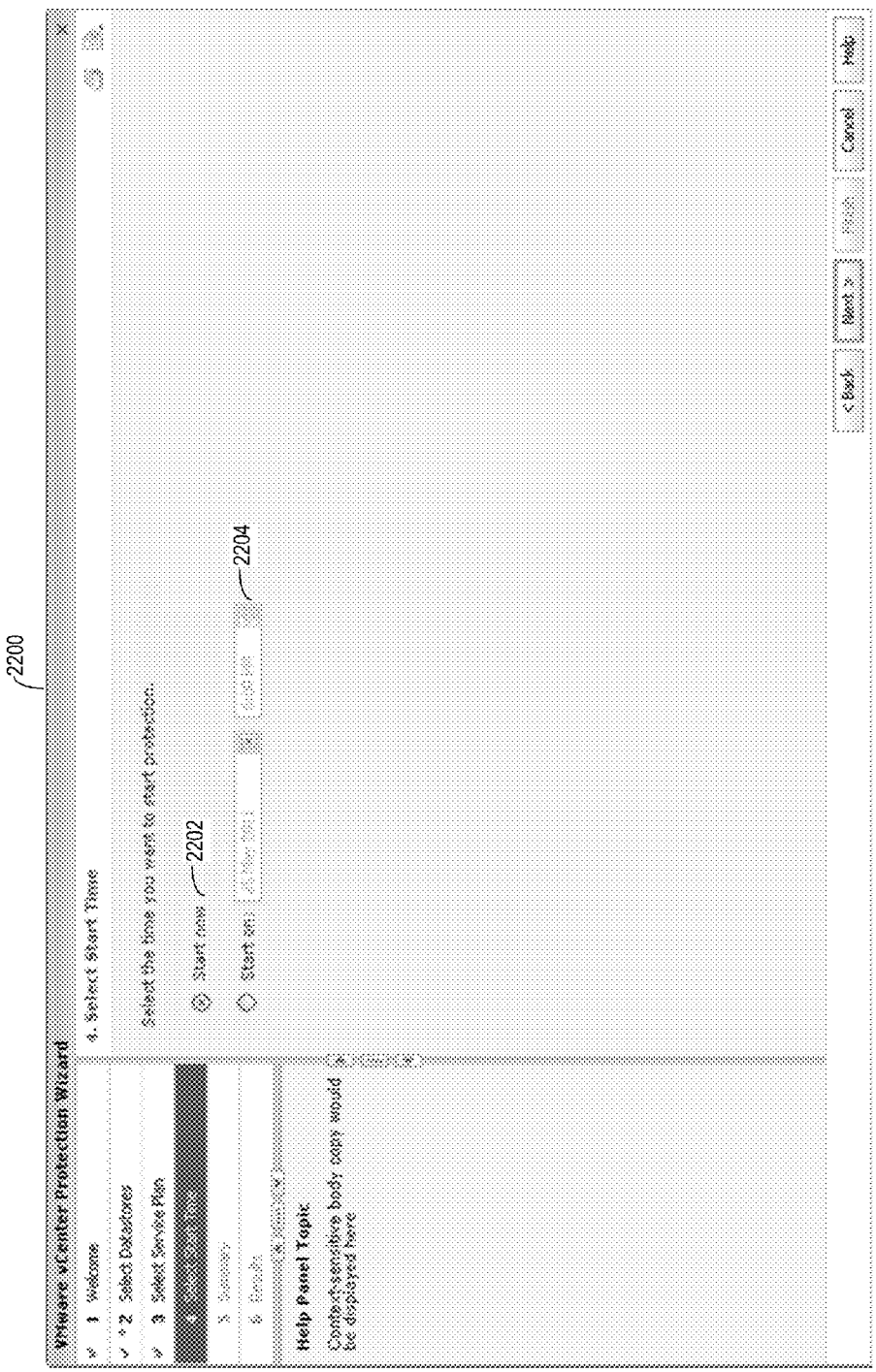

FIG. 22 is a screenshot illustrating a service plan start time screen 2200, such as now 2202 or a defined time 2204.

Figure 23:
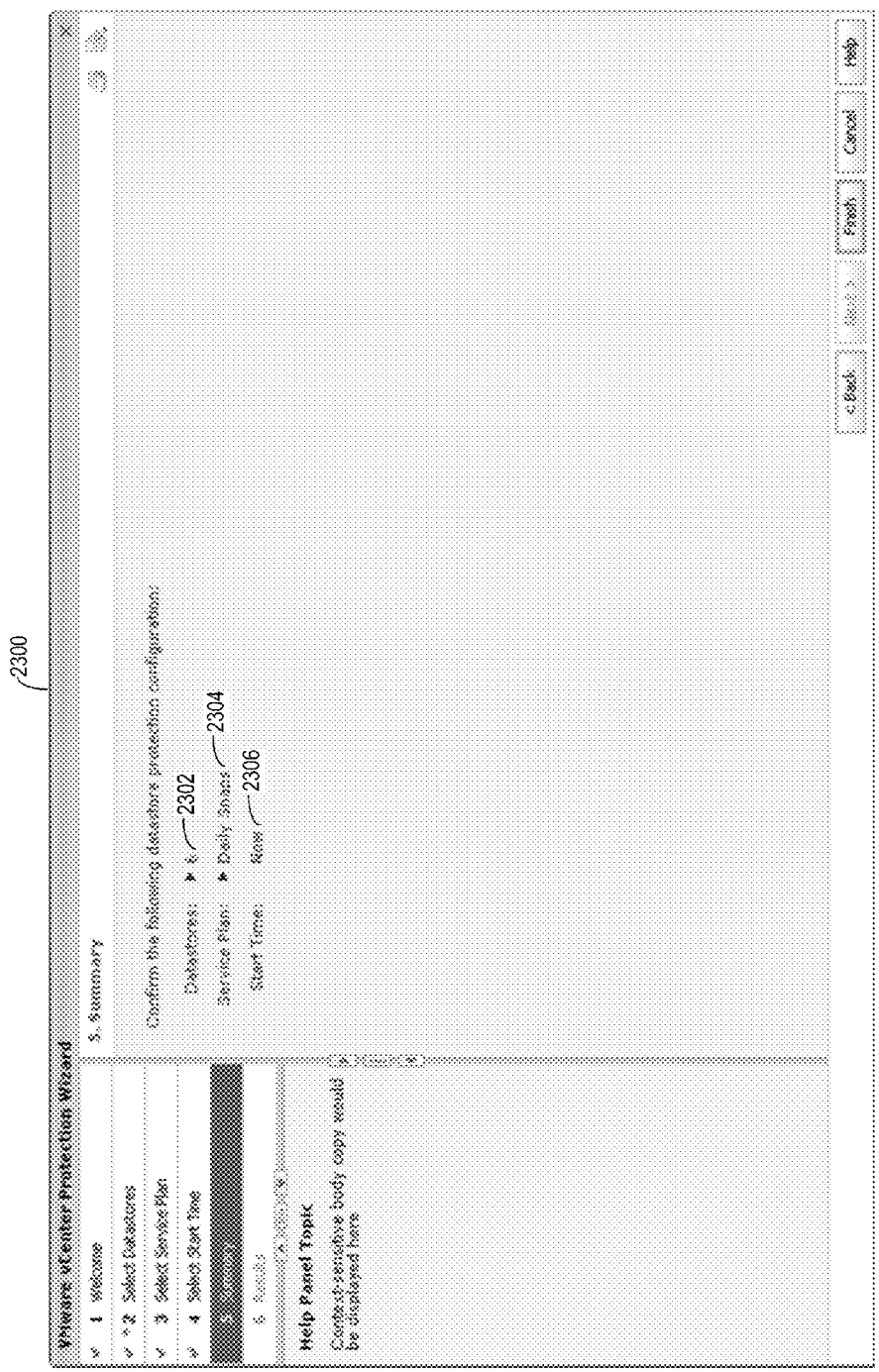

FIG. 23 is a screenshot illustrating a service plan summary screen 2300, including the number of datastores for protections 2302, the selected service plan 2304, and the start time for the service plan 2306.

Figure 24:
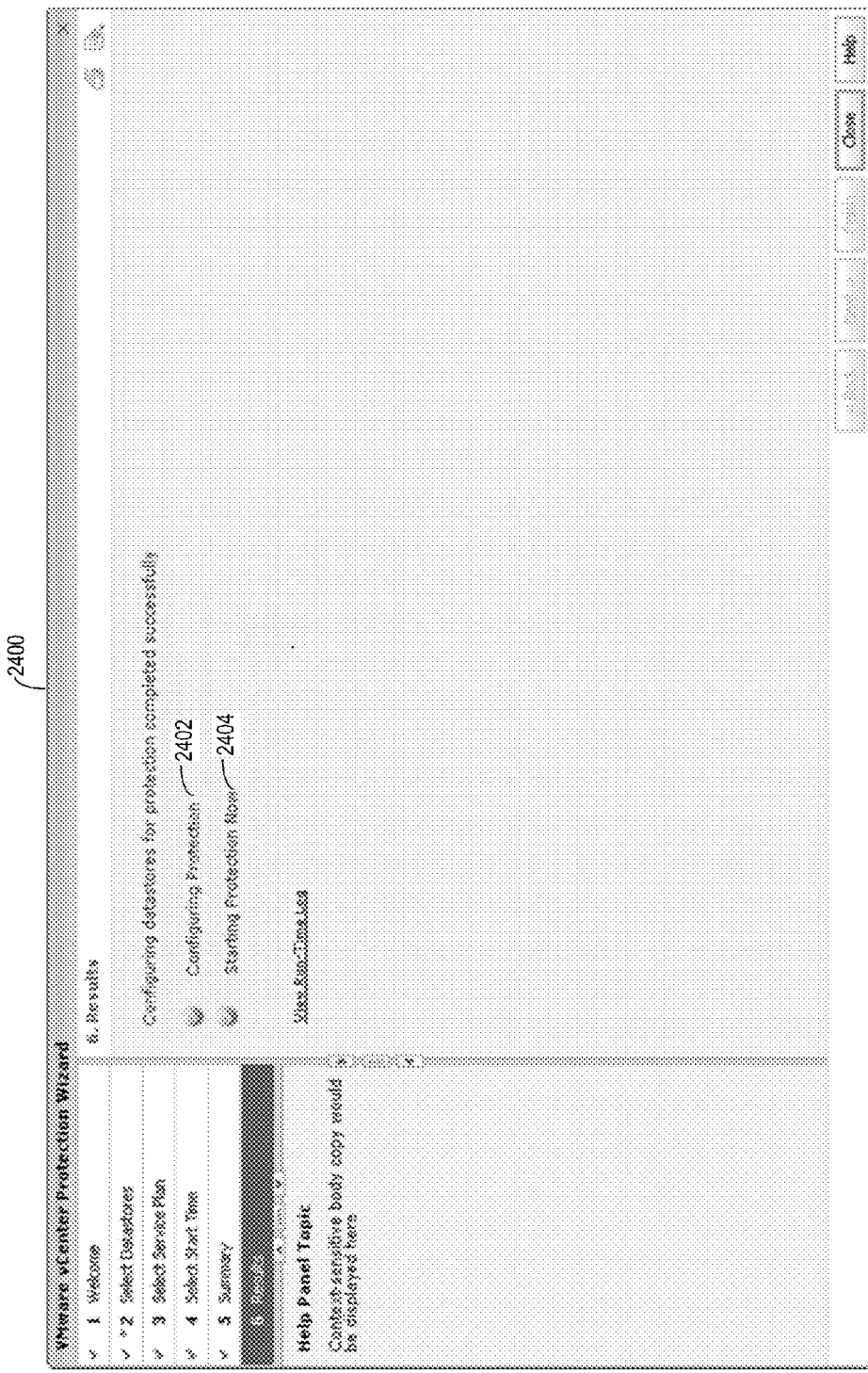

FIG. 24 is a screenshot illustrating a resulting screen 2400 illustrating that the protection has been configured 2402 and protection has started 2404.

Figure 25:
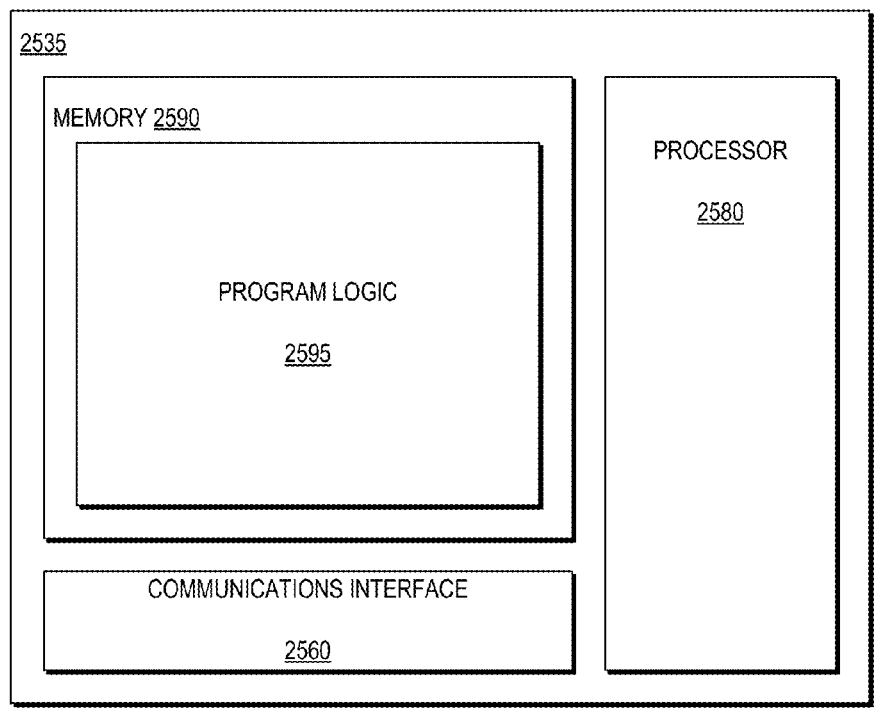
FIG. 25 is a block diagram of an example embodiment apparatus according to the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 25, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 26:
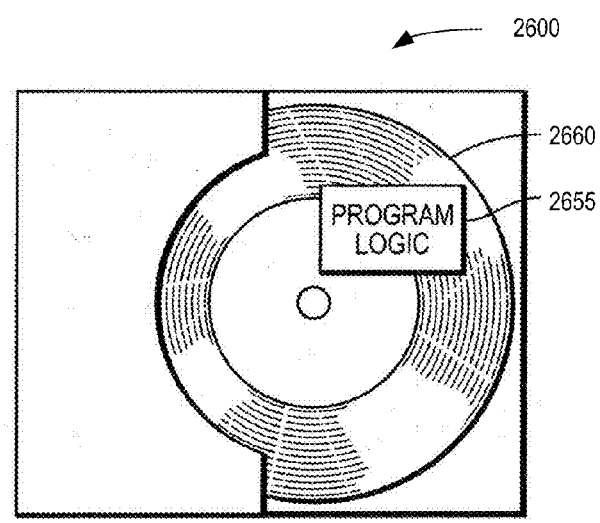
FIG. 26 is an illustration of an example embodiment of the present invention as embodied in program code.

FIG. 26 shows Program Logic 2655 embodied on a computer-readable medium 2660 as shown, and wherein the Logic is encoded in computer-executable code configured for carrying out the reservation service process of this invention and thereby forming a Computer Program Product 2600.

The logic for carrying out the method may be embodied as part of the aforementioned system, which is useful for carrying out a method described with reference to embodiments shown in, for example, FIGS. 1-13. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method, for execution on a computer comprising a processor and memory storing program logic, comprising:

receiving an input defining a desired state of a data protection environment;

monitoring a current state of the data protection environment at a first time;

determining whether the current state of the data protection environment at the first time deviates from the desired state of the data protection environment;

generating a service plan automatically upon determining a deviation in the data protection environment according to the differences between the current state of the data protection environment at the first time and the desired state of the data protection environment, wherein the generated service plan, based on the differences, includes one or more commands automatically selected from a group of command sets consisting of a service plan command set, an application command set, a storage command set, a host command set, an entity command set, and a service command set; and executing the service plan according to the automatically selected commands included in the service plan to affect the current state of the data protection environment from the first time to a second time such that the differences between the current state of the data protection environment at the first time and the desired state of the data protection environment are remedied and the subsequent state of the data protection environment at the second time is equivalent to and does not deviate from the desired state of the data protection environment.

2. The method of claim 1 further comprising:

receiving configuration information regarding storage platforms in the IT infrastructure providing the storage resources; and receiving configuration information regarding network topology in the IT infrastructure.

3. The method of claim 1 wherein generating a service plan according to the differences between the current state of the data protection environment at the first time and the desired state of the data protection environment comprises:

analyzing the current state of the data protection environment;

determining a selection of commands to transform the data protection environment from the current state of the data protection environment to the desired state of the data protection environment to conform to the received input; and configuring the selection of commands.

4. The method of claim 3 wherein analyzing a current state of the data protection environment comprises determining whether the current state of the data protection environment conforms to the desired state of the data protection environment;

wherein determining a selection of commands to transform the data protection environment from the current state of the data protection environment to the desired state of the data protection environment to conform to the received input comprises determining a selection of commands to transform the data protection environment from the current state of the data protection environment to the desired state of the data protection environment to conform to the received input if the current state of the data protection environment does not conform to the desired state of the data protection environment; and wherein configuring the selection of commands comprises configuring the selection of commands to transform the data protection environment from the current state of the data protection environment to the desired state of the data protection environment to conform to the received input.

5. The method of claim 3 wherein executing the service plan comprises directing a plurality of services according to the service plan to transform the data protection environment from the current state of the data protection environment to the desired state of the data protection environment, the services selected from a group consisting of: storage array services, virtual storage services, applications services, host services, and entity services.

6. The method of claim 5 wherein determining a selection of commands to transform the data protection environment from the current state of the data protection environment to the desired state of the data protection environment to conform to the received input if the current state of the data protection environment does not conform to the desired state of the data protection environment comprises determining the selection of commands from a plurality of command sets to transform the data protection environment from the current state of the data protection environment to the desired state of the data protection environment to conform to the received input if the current state of the data protection environment does not conform to the desired state of the data protection environment; and wherein directing a plurality of services according to the service plan to transform the data protection environment from the current state of the data protection environment to the desired state of the data protection environment comprises directing each service of the plurality of services according to respective commands selected from a respective command set to transform the data protection environment from the current state of the data protection environment to the desired state of the data protection environment.

7. An apparatus comprising:
a processor; and
memory storing computer program code that, when executed on the processor, causes the apparatus to perform the operations of:
receiving an input defining a desired state of a data protection environment;
monitoring a current state of the data protection environment at a first time;
determining whether the current state of the data protection environment at the first time deviates from the desired state of the data protection environment;
generating a service plan automatically upon determining a deviation in the data protection environment according to the differences between the current state of the data protection environment at the first time and the desired state of the data protection environment, wherein the generated service plan, based on the differences, includes one or more commands automatically selected from a group of command sets consisting of a service plan command set, an application command set, a storage command set, a host command set, an entity command set, and a service command set; and
executing the service plan according to the automatically selected commands included in the service plan to affect the current state of the data protection environment from the first time to a second time such that the differences between the current state of the data protection environment at the first time and the desired state of the data protection environment are remedied and the subsequent state of the data protection environment at the second time is equivalent to and does not deviate from the desired state of the data protection environment.

8. The apparatus of claim 7 wherein the computer code is further configured to perform the operations of:
receiving configuration information regarding storage platforms in the IT infrastructure providing the storage resources; and
receiving configuration information regarding network topology in the IT infrastructure.

9. The apparatus of claim 7 wherein the computer program code is further configured to perform the operations of:
analyzing the current state of the data protection environment;
determining a selection of commands to transform the data protection environment from the current state of the data protection environment to the desired state of the data protection environment to conform to the received input; and
configuring the selection of commands.

10. The apparatus of claim 9
wherein analyzing a current state of the data protection environment comprises determining whether the current state of the data protection environment conforms to the desired state of the data protection environment;
wherein determining a selection of commands to transform the data protection environment from the current state of the data protection environment to the desired state of the data protection environment to conform to the received input comprises determining a selection of commands to transform the data protection environment from the current state of the data protection environment to the desired state of the data protection environment to conform to the received input if the current state of the data protection environment does not conform to the desired state of the data protection environment; and
wherein configuring the selection of commands comprises configuring the selection of commands to transform the data protection environment from the current state of the data protection environment to the desired state of the data protection environment to conform to the received input.

11. The apparatus of claim 9 wherein executing the service plan comprises directing a plurality of services according to the service plan to transform the data protection environment from the current state of the data protection environment to the desired state of the data protection environment, the services selected from a group consisting of: storage array services, virtual storage services, applications services, host services, and entity services.

12. The apparatus of claim 11
wherein determining a selection of commands to transform the data protection environment from the current state of the data protection environment to the desired state of the data protection environment to conform to the received input if the current state of the data protection environment does not conform to the desired state of the data protection environment comprises determining the selection of commands from a plurality of command sets to transform the data protection environment from the current state of the data protection environment to the desired state of the data protection environment to conform to the received input if the current state of the data protection environment does not conform to the desired state of the data protection environment; and
wherein directing a plurality of services according to the service plan to transform the data protection environment from the current state of the data protection environment to the desired state of the data protection environment comprises directing each service of the plurality of services according to respective commands selected from a respective command set to transform the data protection environment from the current state of the data protection environment to the desired state of the data protection environment.

13. A computer program product including a non-transitory computer-readable storage medium having computer program code encoded thereon that, when executed on a processor of a computer, causes the computer to automate data protection, the computer program code comprising:
computer program code for receiving an input defining a desired state of a data protection environment;
computer program code for monitoring a current state of the data protection environment at a first time;
computer program code for determining whether the current state of the data protection environment at the first time deviates from the desired state of the data protection environment;
computer program code for generating a service plan automatically upon determining a deviation in the data protection environment according to the differences between the current state of the data protection environment at the first time and the desired state of the data protection environment, wherein the generated service plan, based on the differences, includes one or more commands selected from a group of command sets consisting of a service plan command set, an application command set, a storage command set, a host command set, an entity command set, and a service command set; and computer program code for executing the service plan in the data protection environment according to the commands included in the service plan to affect the current state of the data protection environment from the first time to a second time such that the differences between the current state of the data protection environment at the first time and the desired state of the data protection environment are remedied and the subsequent state of the data protection environment at the second time is equivalent to and does not deviate from the desired state of the data protection environment.

14. The method of claim 1 wherein storage command set includes storage related operations.

15. The method of claim 1 wherein the application command set includes business logic to translate application objects to file system objections for replication.

16. The method of claim 1 wherein the host command set includes host and file system related operations.

17. The apparatus of claim 7 wherein storage command set includes storage related operations.

18. The apparatus of claim 7 wherein the application command set includes business logic to translate application objects to file system objections for replication.

19. The apparatus of claim 7 wherein the host command set includes host and file system related operations.

20. The computer program product of claim 13 wherein storage command set includes storage related operations.

21. The computer program product of claim 13 wherein the application command set includes business logic to translate application objects to file system objections for replication.

22. The computer program product of claim 13 wherein the host command set includes host and file system related operations.

* * * * *